United States Patent [19]
Chadwick

[11] 4,021,274
[45] May 3, 1977

[54] METHOD FOR HEAT TREATING BY INDUCED CURRENT

[75] Inventor: Donald H. Chadwick, Geneva, Ohio

[73] Assignee: Russell, Birdsall & Ward, Inc., Mentor, Ohio

[22] Filed: Mar. 26, 1975

[21] Appl. No.: 562,111

[52] U.S. Cl. .............................. 148/146; 148/39; 148/147; 148/150; 148/152; 148/154

[51] Int. Cl.² .......................................... C21D 1/10

[58] Field of Search .......... 148/154, 150, 146, 147, 148/152, 39

[56] References Cited
UNITED STATES PATENTS

| | | | |
|---|---|---|---|
| 1,946,876 | 2/1934 | Northrup | 148/150 |
| 3,769,103 | 10/1973 | Wardwell et al. | 148/150 |

Primary Examiner—R. Dean
Attorney, Agent, or Firm—McNenny, Pearne, Gordon, Gail, Dickinson & Schiller

[57] ABSTRACT

Steel workpieces, such as thread-forming screws and bolts, tapping tools, and the like, are hardened in localized areas to controlled depths of hardening by utilizing loose electromagnetic coupling between the workpiece and the induction coil. The loose coupling reduces the criticality of the positional relationship between the workpiece and coil and also allows unidirectional axial through-feed of headed workpieces. A high degree of symmetry of hardening around each piece and uniformity of hardening from piece to piece at high production speeds is accomplished.

6 Claims, 21 Drawing Figures

U.S. Patent   May 3, 1977   Sheet 1 of 4   4,021,274
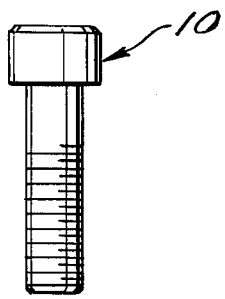
Fig. 1
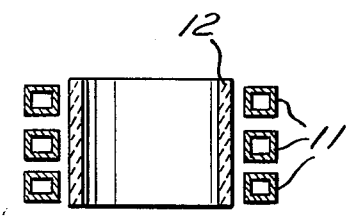
Fig. 2
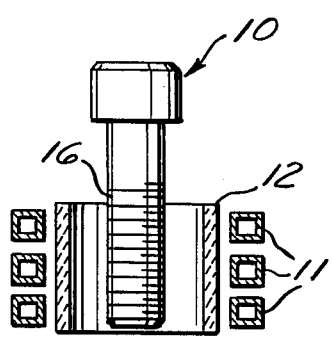
Fig. 3
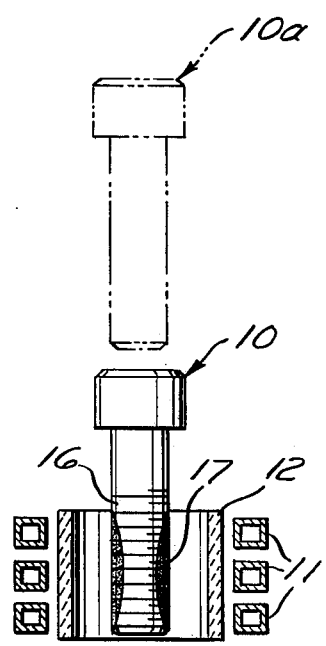
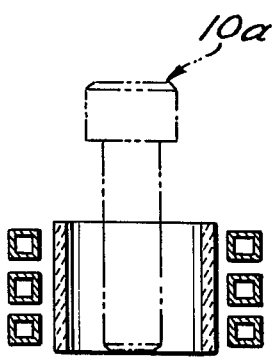
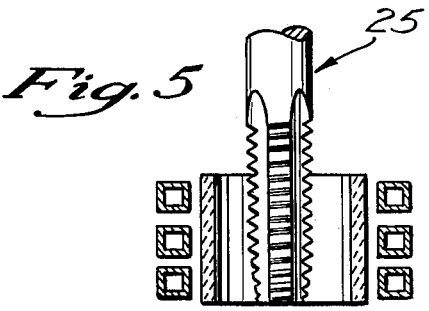
Fig. 5
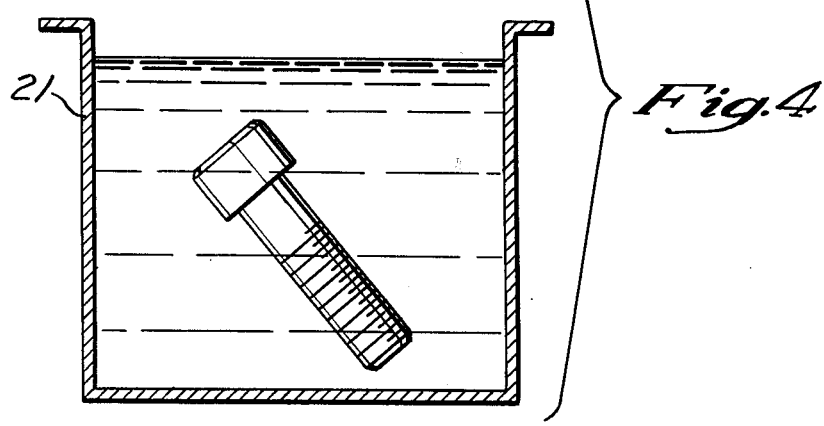
Fig. 4
Fig. 6

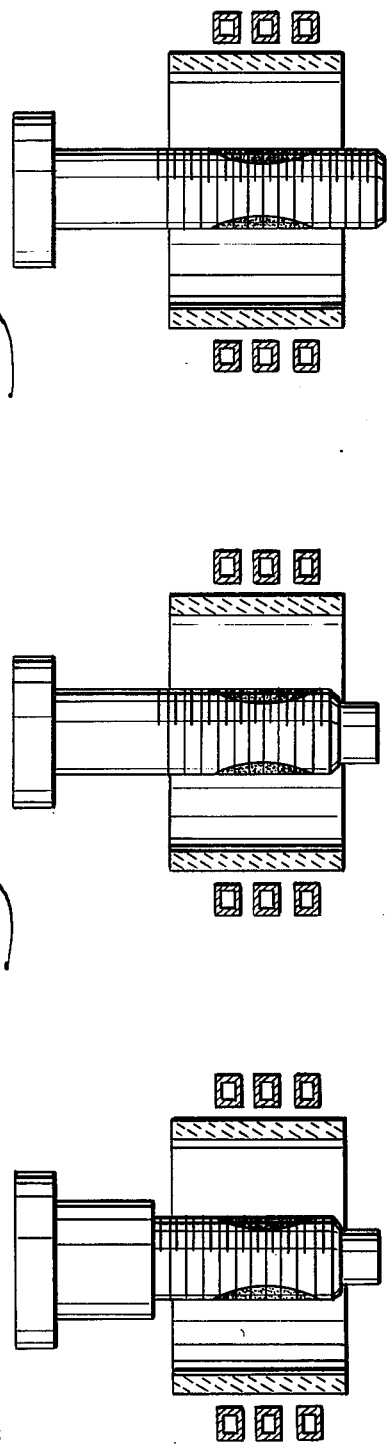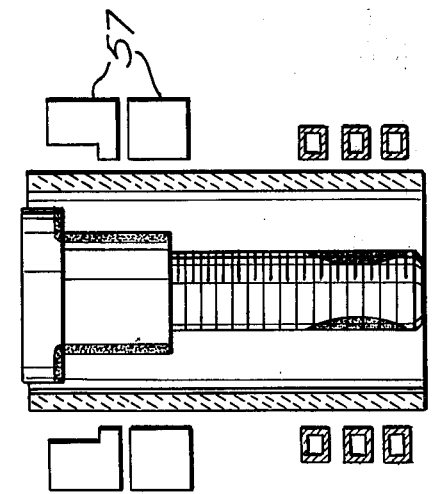

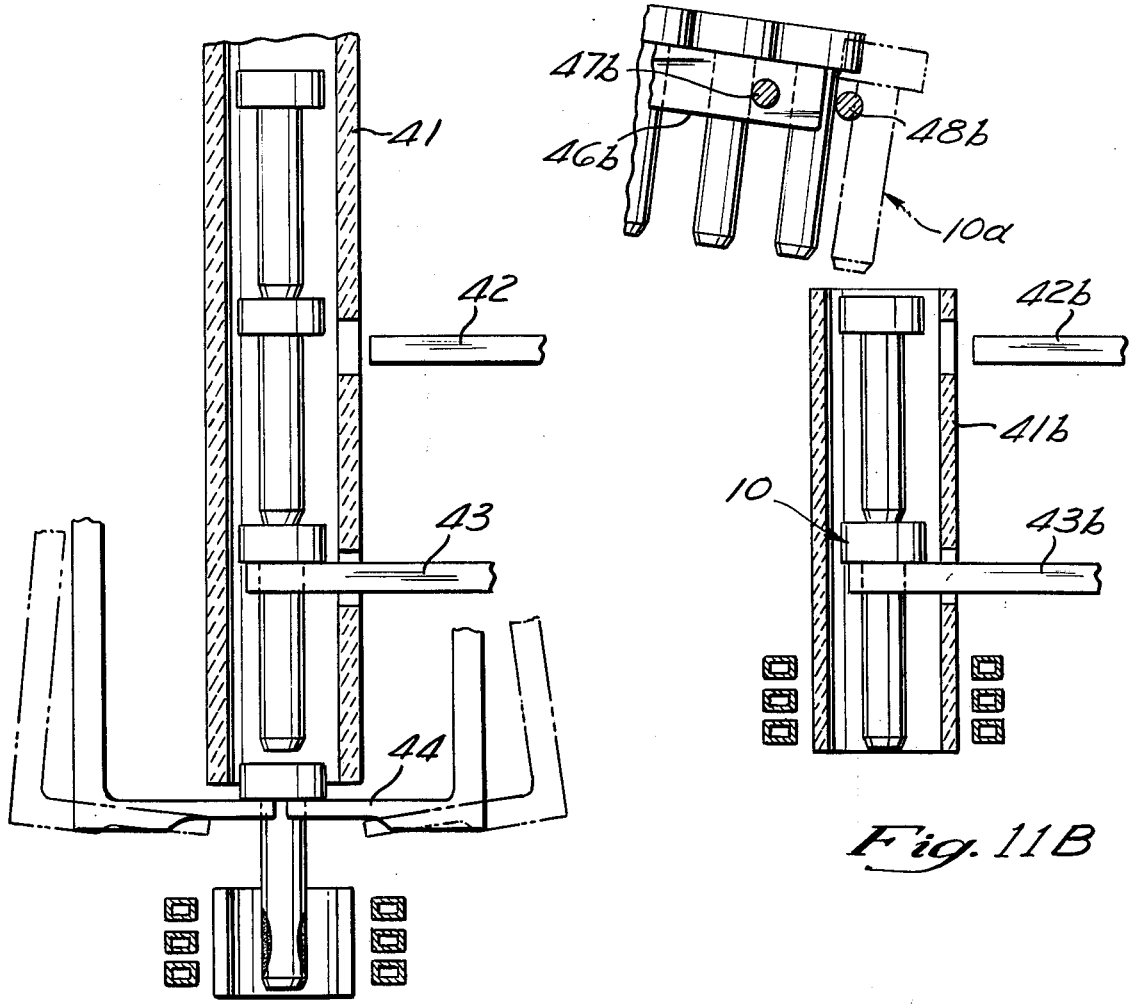
Fig. 11A
Fig. 11B
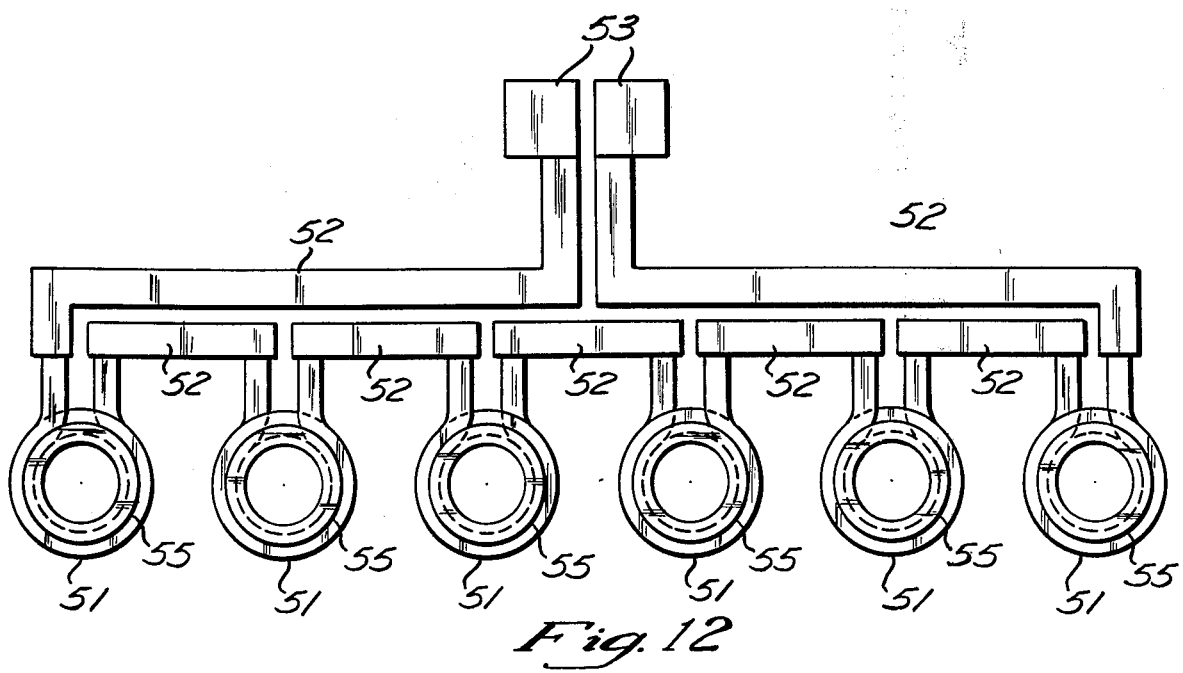
Fig. 12

METHOD FOR HEAT TREATING BY INDUCED CURRENT

INDUCTION SURFACE HARDENING MEANS AND APPARATUS

This invention relates to the induction hardening of steel workpieces, such as thread-forming screws and bolts, fasteners, thread-forming tapping tools, cutting tapping tools and other cutting tools, recess driving tools, and the like, to controlled depths and in localized areas. Such hardening may be generally referred to as induction surface hardening.

BACKGROUND OF THE INVENTION

As a general method, induction surface hardening can produce improved properties as compared to surface hardening by other means such as carburizing, cyaniding and nitriding methods which have been used for hardening of such diverse products as crankshafts, bearing races, drive shafts, axle shafts, steering knuckles, and many other products. Among the improved properties are improved torsional fatigue strength, increased load carrying capacity, increased fatigue endurance life, ability to substitute medium carbon steel for low alloy steel, less distortion, and a surface more easily plated and less susceptible to the effects of molecular hydrogen diffusion or hydrogen embrittlement as a result of the cleaning or plating process. Induction hardening as a manufacturing process and engineering design tool has many desirable attributes. No contact is required between the work load and the heat source. The workpiece may be rapidly heated. Process control variables are simply controlled. Heating efficiency is generally higher than that offered by other furnace type methods. Very high temperatures can be achieved. The heating means is readily adapted to other production processes and methods. Working conditions are relatively cool and clean. Controlled atmospheres or vacuum can be used to protect the workpiece. A particular feature is that in many applications induction heating lends itself to flexible but reasonably close control of the locus of heating so as to restrict heat to localized areas and to desired depths of penetration.

Induction surface hardening of workpieces such as thread-forming screws and bolts and the like is intended to harden the workpiece at preselected areas and to preselected depths, often to just below the thread root, leaving the balance of the screw thread and the core material of the screw in a ductile condition. The avoidance of hardening at unwanted areas and depths is often as important as the accomplishment of hardening at desired areas and depths. For example, it may be desired to harden the leading threads of a screw for proper cutting action or thread forming action while avoiding hardening of following threads so that they remain ductile for best strength and best anchoring and holding action. Where threads are to be hardened, it is often desirable that the bulk of the metal below the threads remain ductile so that a tough strong core for the screw is provided. Obviously, it is desirable that symmetry of hardening within the piece and uniformity of hardening from piece to piece be achieved to the greatest practical extent. For example, to the extent that there is lack of symmetry in hardening around the circumference of a screw section, then at certain circumferential locations either the core will be correspondingly weakened by unwanted hardening or the threads will be defective by reason of insufficient hardening.

The advantages outlined for workpieces that function as thread forming screws, bolts or taps have equal importance in applications in which metal is removed such as is the case with taps, reamers, key seat cutters, milling cutters and various similar cutting action tools. The efficiency, life and precision of operation can be enhanced and improved by the application of the principles of induction surface hardening.

The ability of induction surface hardening techniques to develop the full hardness capabilities of the tool material at the cutting surface and yet retain the desirable tool characteristics of toughness and ductility, and the avoidance of brittleness are important applications of the invention to be described.

TWO PRIOR ART METHODS

Two methods are currently used in the prior art to accomplish induction surface hardening of workpieces such as screws and bolts. One is the use of a helical induction coil with which the workpiece becomes closely coupled upon axial insertion of the workpiece and energization of the coil. The second method is the use of a channel coil in the form of one or more greatly elongated turns between the two parallel sides of which a succession of workpieces travel laterally, and in some instances the workpieces turn on their own axes. The ends of the channel coil may be turned upwardly or downwardly or enlarged to allow lateral entrance and egress of the workpieces.

PROBLEMS OF PRIOR ART HELICAL COIL METHOD

For a headed workpiece, such as a bolt or screw, or any workpiece where a portion of the workpiece diameter is larger than the coil inside diameter, if a closely coupled helical coil is used for induction surface hardening, provision for proper quenching becomes complicated. The workpiece cannot be dropped through the coil to a quench station and must either be quenched in situ or removed with appropriate horizontal and vertical motions and dropped or carried to a quench station. Where quenching in situ is performed, the inductor coil design is complicated and the inductor coil initial cost as well as its maintenance cost is very high. Where horizontal and vertical transfer of the workpiece to a quench station is provided, the transfer apparatus is complicated, costly an difficult to maintain. The practice of removing the workpiece from the coil by hand and dropping it into a quench tank is a very unreliable method; however it is widely used even though the time from heat removal to quenching is generally critical and must be closely controlled or the hardened depth will be deeper than desired and the hardness level will be lower.

In the induction heating step itself, accurate orientation of the workpieces with respect to the magnetic field generated by the inductor coil is critical. Wide variations in the area and depth of heating are associated with relatively small variations in alignment and spacing. Such variations may be due to inaccurate positioning of the workpieces or slight irregularities in the coil, or both. Any slight dimensional variation from workpiece to workpiece is also given a magnified effect. Different part sizes require different coil diameters.

Special difficulties are also presented in the use of closely coupled helical coils for some unheaded workpieces. Some types of unheaded workpieces have never been uniformly induction surface hardened successfully at reasonable production rates, and the service life of the product has been limited by the necessity of resorting to through-hardening or to using other hardening methods. Tapping tools, for example, used in volume production nut tapping or for like purposes, experience high breakage rates because controlled surface hardening at reasonable production rates has not been achieved. The problem of achieving controlled surface hardening on tapping tools is complicated by the circumferential (annular) discontinuity of the tool cross section due to fluting, as well as by the critical orientation problems mentioned above.

The closely coupled helical inductor coil is capable of producing uniform high quality parts when coupled with a properly designed and integral arrangement for quenching in situ. However, production rates and applications are limited and tooling and part handling costs are high because of the factors just discussed. In order to partially overcome these limitations various arrangements of multiple vertical moving coils, indexing tables and complex part feeding arrangements are employed, at greatly increased equipment costs.

PROBLEMS OF PRIOR ART CHANNEL COIL METHOD

The channel type inductor coil increases the rate at which workpieces can be induction surface hardened, but at a penalty in quality.

In the channel type inductor coil, workpieces are translated laterally through the constantly energized coil at a rate controlled by gravity, by part to part pressure, by mild vibratory motion, or by a combination of these means, and may be simultaneously rotated, and the workpieces are spray or flush quenched as they leave the coil, or are dropped from the coil into a quench tank.

Failure of the part to rotate, or to rotate uniformily, will produce a non-symmetrical heat pattern. Changes in feeding rate of individual workpieces through the channel coil causes wide variations in uniformity and depth of hardening. Individual feeding rates can be affected by the presence of oil, dirt, chips carried along with the workpiece, burrs, variations in workpiece geometry, and other factors. Momentary stoppages of individual parts may be followed by unduly fast movement of following workpieces as the stoppage is relieved, so that the momentarily stopped parts may be throughhardened and the following parts may not even be heated sufficiently to raise any portion of the desired area to austenitizing temperature to allow the harden-quench process to take place, and such parts may simply be retempered and be below original core hardness in the area affected by the coil heat pattern.

The unpredictable and random nature of such defect-producing occurrences as just described forces the use of restrictive production procedures. Elaborate sampling plans, process check sheets, set-up and production logs, and a wide variety of workpiece performance test are used, without fully satisfactory results.

Set-up of a channel coil to produce workpieces with anything approaching uniformity is very difficult. Set-up variables such as power level, frequency, coupling distance, speed rate, and part temperature must be selected and/or stabilized and trial parts must be sectioned, polished and nital etched to confirm or deny the hardened area obtained for each changed or adjusted variable. An alternative is the use of relatively sophisticated ultrasonic or eddy current measuring and testing equipment.

In critical applications where high reliability is required and cost is no object, induction surface hardening can be accomplished with a channel coil through 100% testing of each workpiece or through individual positive feed, location, and rotation of each workpiece. Both procedures involve prohibitive costs for almost all practical applications and low production rates.

SUMMARY OF THE INVENTION

This invention hardens steel workpieces, such as thread-forming screws and bolts, fasteners, thread-forming tapping tools, cutting tapping tools and other cutting tools, recess driving tools, and the like to controlled depths with a high degree of symmetry and uniformity by the use of loose electromagnetic coupling and the consequent avoidance of the steepest flux density gradients and the critical orientation demands attendant thereon. Loss in heating efficiency through loose coupling is more than compensated by a payback in production rate, quality and other advantages of the invention. The loosely coupled coil greatly simplifies the controls and the equipment required to automate the entire process from part orientation to quench, and allows through-feed of headed workpieces.

In the drawings,

FIGS. 1 through 4 are schematic drawings showing a sequence of operations on a headed workpiece according to the invention.

FIG. 5 is a similar schematic drawing illustrating the treatment of a threaded tap according to the invention.

FIG. 6 is an open end view of the tap seen in FIG. 5 with the other parts omitted.

Figure 8A:
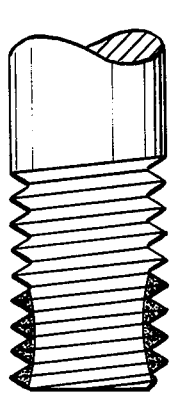
Figure 8B:
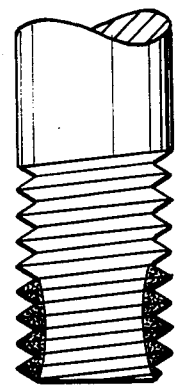
Figure 8C:
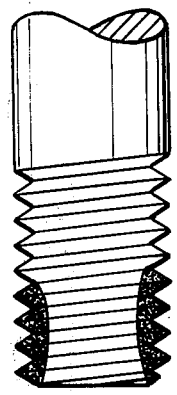

FIGS. 8A, 8B, and 8C illustrate the results of induction hardening according to the invention under a given set of conditions with one factor varies.

Figure 9A:
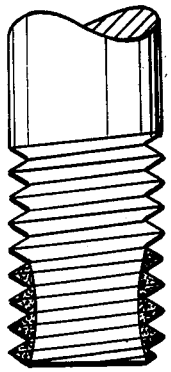
Figure 9B:
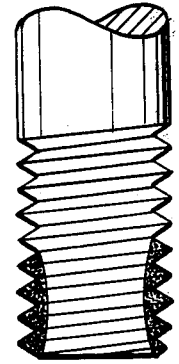

FIGS. 9A and 9B illustrate results under a slightly different set of conditions with the same factor varied.

FIGS. 10A through 10F are schematic drawings illustrating certain advantages and features of the invention.

FIGS. 11A and 11B are schematic illustrations of feeding arrangements which may be used in the practice of the invention.

FIG. 12 is a plan view showing a typical six-position inductor coil array which can be powered by a single generator.

In FIGS. 1 through 4 a workpiece in the form of a headed bolt 10 is to be heated in an inductor coil 11. The inductor coil is protected from mechanical damage by use of an insulator sleeve 12. In accordance with known practice, the sleeve 12 is selected for its high electrical resistance and other characteristics which make it suitable for use in the high frequency magnetic field of the inductor with a minimum distortion of the magnetic flux lines.

The inductor coil 11 is powered by a suitable generator (not shown) of known type for induction heating having the following known features:
1. Adjustable frequency
2. Timed power on-off cycle 3. Adjustable power output
4. Variable load transformer
5. 50 milliseconds response time or better The workpiece 10 is withdrawn from a storage source and oriented by means of a vibratory bowl or similar device (not shown) and positioned at a point above the inductor coil, as shown in FIG. 1.

The workpiece is then fed axially into the inductor coil to a dwell position in which the localized areas to be treated are surrounded by the coil, as shown in FIG. 2. The coil 11 and insulator 12 are spaced from the shank 16 of the workpiece by more than the distance by which the head of the workpiece protrudes radially beyond the shank, as is clearly seen in FIGS. 2 and 3.

When the workpiece reaches the position shown in FIG. 2, it is approximately centered with respect to the coil, but may be loosely constrained by appropriate feeding and positioning means (to be later described) so that the workpiece is free to float to a more precisely centered position.

FIG. 3 illustrates the stage in which the coil is energized to heat the shank 16 in the localized area 17 indicated by shading. As the coil is energized to commence the heating step shown in FIG. 3, the magnetic field acts on the workpiece to move it laterally to the precise magnetic center of the coil, unless the workpiece is already so centered. Such movement is accommodated by the previously mentioned loose mechanical constraint of the workpiece by the feeding and positioning means. No effort has been made in FIGS. 2 and 3 to distinguish between illustration of the approximately centered condition and the precisely centered condition, since the scale of the illustrations is such that the difference in positioning is difficult to show.

The relatively large spacing between the shank 16 and the inductor 11 provides an electromagnetic coupling between the parts that is loose or remote as compared to the tight or close coupling of the prior art where the spacing between the coil and the workpiece is minimized. The critical orientation demands of the prior art are thereby avoided. The avoidance of critical orientation demands produces a high degree of uniformity in the treatment of the succession of workpieces of which workpiece 10 is a member, and such uniformity is enhanced by the precise magnetic centering action.

Although the rate of heat generation in the areas 17 that are to be hardened is somewhat lower than it would be with close coupling, the metal nevertheless can be heated at the desired areas at a sufficiently high rate of heat generation to raise the metal in the desired areas to austenitizing temperature at locations shallower than a desired depth of hardening without heat penetration to austenitizing temperature occurring below the desired depth of hardening, and with the advantages of great piece-to-piece uniformity as just described. The rate of heat generation is proportional to the square of the ampere-turns of the coil, so that if, for example, the coil current is increased by a multiple of three, the heat rate will increase by a multiple of nine. It is well within the limits of practicality to largely or wholly compensate for the loss in heating rate due to loose coupling by increasing the coil current over that used in the prior art for a given workpiece size. While the resulting greater power consumption represents a loss in heating efficiency, this loss is exceeded by the payback in production quality and the other advantages of the invention, previously mentioned.

As is known, the effective depth of direct heating by induced eddy current can be approximately expressed by the formula $$d = \sqrt{\frac{4}{f}}$$

where
$d$ = effective depth (inches)
$f$ = magnetic field frequency (hertz)

From this formula the following table can be constructed:

| frequency (hertz) | depth (inches) |
| --- | --- |
| 3,000 | 0.035 |
| 10,000 | 0.020 |
| 500,000 | 0.003 |

The heat penetration depth below the eddy current zone as heating occurs can be approximately expressed by the formula $$p = \sqrt{0.0015t}$$

where
$p$ = heat penetration (inches)
$t$ = duration of induction heating (seconds)

From this formula the following table can be constructed:

| duration (seconds) | heat penetration depth (inches) |
| --- | --- |
| 0.5 | 0.027 |
| 1.0 | 0.039 |
| 2.0 | 0.055 |

The foregoing assumes that there is no delay between turning the power off and cooling the workpiece. Such delay will further increase the depth of hardening beyond the value $d + p$. For example, if a workpiece is heated to a surface temperature of 165° F and is 0.500 inch in diameter, a delay of 0.7 seconds between power-off and quenching below critical temperature will through-harden the workpiece to the center. Accordingly the workpiece is promptly cooled to below critical temperature after power is turned off, as by being dropped into a quench bath contained in the quench tank 21 (FIG. 4). Since, as shown, the inductor coil 11 and insulator 12 are radially spaced from the shank 16 by more than the distance by which the head of the workpiece protrudes radially beyond the shank, the workpiece can simply be released by the feeding and positioning means (not shown) and allowed to drop through the inductor to the quench bath which may be located directly below the coil. The time between power-off and quench can be kept small and the corresponding additional depth of heating can be accounted for by choosing the depth and corresponding duration of power-on heating so that power-on and power-off heat penetration do not together exceed the desired depth of hardening. Cooling is thus accomplished prior to the occurrence of austenitizing heat penetration below the desired depth of hardening.

As shown in FIGS. 3 and 4, a succeeding workpiece 10a may be positioned behind the workpiece 10 at least by the time power-on heating of the workpiece 10 is completed, so that the succeeding workpiece 10a may move into position for heating as the workpiece 10 itself leaves the heating station, thus compressing total cycle time.

The use of the invention with a tapping tool 25 is illustrated in FIG. 5. As is typical of such tools or of other cutting tools, recess driving tools and the like, a portion of the tool has alternating highs and lows. For example, the lower shank of tap 25 has alternating flutes and ridges, in this case three of each as seen most clearly in FIG. 6. Such circumferential or annular discontinuities in the geometry of taps or similar tools makes them extremely difficult to harden to controlled depths by induction heating with any uniformity since the electromagnetic field tends to concentrate at the ridges, making the problem of attaining accurate and uniform heat penetration so difficult that taps have not heretofore been successfully hardened to controlled depths by induction heating on any volume production basis. Such an accomplishment can be effected by the loose coupling contemplated by the present invention and has the promise of greatly increasing tap service life. One advantage of tap service life improvement is that it in turn can greatly enhance the mass production of tapped nuts on multiple spindle nut tapping machines where tap breakage is a recurrent problem hat limits productivity and requires additional inspection or sorting apparatus. The tap shown in FIG. 5 is in heating position. As shown, the spacing between the workpiece or tap 25 and the associated coil materially exceeds the spacing required for clearance or mechanical protection of the coil from the workpiece so that the parts are positionally related for loose electromagnetic coupling. The heating and quenching of the taps may be similar to that described in connection with the bolt 10.

Figure 7:
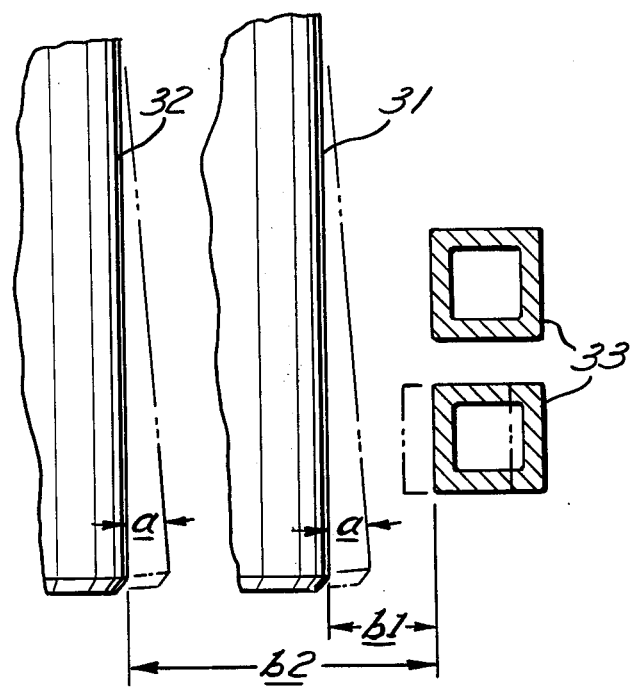
FIG. 7 is a schematic diagram on an enlarged scale comparing the invention with the practice of the prior art in certain respects.

FIG. 7 diagrammatically compares the tightly coupled positional relationship between the workpiece and coil as in the prior art and the loosely coupled relationship according to the present invention. In this diagrammatic showing, both loosely and closely coupled workpieces are simultaneously shown for purposes of comparison, although of course such simultaneous positioning could not physically occur because two workpieces cannot occupy the same space. Only one side of each workpiece and one side of the coil is illustrated. The relative adjacency between the workpiece 31 and the coil 33 typifies the close coupling of the prior art, the distance between the workpiece 31 and the coil 33 being indicated as the distance b1. The greater distance between the workpiece 32 and the coil 33 illustrates the loose coupling of the present invention, this greater distance being indicated as b2. In FIG. 7 the workpiece 31 and 32 are indicated in phantom lines as being misaligned by the same amount $a$ at a point adjacent one end of the coil 33. The misalignment is exaggerated for clarity. It can be seen that the ratio $a/b1$ representing the proportional change in spacing from the coil 33 by reason of misalignment of the workpiece 31 is substantially in excess of the ratio $a/b2$ which represents the proportional change in spacing of the workpiece 32 from the coil 33 by reason of misalignment. Also, the flux density gradient across the distance $a$ is considerably steeper in the close coupled case than in the loose coupled case. Similarly, it can be seen that irregularities in the coil 33, such as the undersized turn exaggeratedly indicated in phantom lines in FIG. 7, will represent a much greater proportional change in spacing with respect to the close coupled workpiece 31 than it will with respect to the loose coupled workpiece 32. The magnetic effects with changing spacing are exponential so that the reduction in criticality of positioning is even greater than the above comparison of proportions indicates.

One feed and positioning means that can be used for headed workpieces is shown in FIG. 11A. The workpieces are oriented and positioned by conventional means in a nonmagnetic tube 41. Progress of the workpieces through the tube is governed by the excapements 42, 43 and 44. Escapement 42 is shown in its open position, and escapement 43 in its closed position. Escapement 44 is shown in its closed position in solid lines and in its open position in phantom lines. The FIG. 11 solid line position of the parts illustrates the heating portion of the cycle. The workpiece being heated is supported by the laterally projecting fingers of the escapement 44, but is not tightly gripped thereby, so that the workpiece can precisely center itself under the influence of the electromagnetic field of the coil, as previously described. The succeeding workpiece is restrained by the escapement 43.

Upon completion of the heating step, the escapement 44 opens to release the just-heated workpiece, and thereupon recloses to loosely receive a succeeding workpiece. Meanwhile the escapement 43 opens to release the succeeding workpiece. Prior to the opening of the excapement 43, the escapement 42 closes to restrain further descent of the workpieces until the escapement 43 again closes, whereupon the escapement 42 is again opened.

A similar escapement (not shown) can be used with headless workpieces such as taps where the upper ends of the flutes can be engaged by multiple gripping fingers similar to the escapements 42 and 43 but adapted to project into the conveyor tube from three directions. In such an arrangement, the conveyor tube has an inside diameter only slightly larger than the outside diameter of the taps. The lowermost escapement corresponding to the escapement 44 are similarly adapted to come in from three directions instead of two directions to engage the upper ends of the flutes of each workpiece positioned at the heating station. From FIG. 5 it will be seen that there is sufficient clearance above the heating coil to accommodate such gripping.

It presently appears that it may be advantageous to construct the protective insulator at the heating station as an extension of a feed tube. Thus the feed tube 41b shown in FIG. 11B may extend into the heating coil as shown. Or, the same feed arrangement shown in FIG. 11B may be employed but the feed tube 41b may be terminated at or above the top of the coil and a separate protective insulator sleeve (not shown) may be provided within the coil. The protective shield for the coil may be eliminated in applications where it is not required.

Also, as shown in FIG. 11B, the feeding arrangement may be such that the workpiece 10 being heated is contacted by the succeeding workpiece, as shown in FIG. 11B. The escapement 43b acts to loosely support the workpiece 10 at the treating station. The escapement 42b is inserted to restrain the following workpiece 10a during release of the workpiece 10. As soon as the escapement 43b is re-inserted in the tube 41b following release of workpiece 10, escapement 42b may be withdrawn to allow succeeding workpiece 10a to drop until the underside of its head is supported on escapement 43a.

Workpieces may be intermittently fed into the tube 41b to drop into the top of the tube at the same time or shortly after the time in each cycle that a workpiece drops in the tube to the heating position. The intermittent feed shown in FIG. 11B included a slanting track 46b and transverse escapement fingers 47b and 48b which move in and out perpendicular to the plane of the paper so as to release the workpieces one by one off the each of the track. Guide members (not shown) may aid in tunneling the workpieces into the upper end of the tube 41b.

The escapement may be made of steel for wear and strength. Desirably the escapements, and particularly those close to the heating station, such as 43b, are supported and moved by dielectric members (not shown) so as to limit power drain and/or heating of the escapements.

Other feed and positioning arrangements may be employed.

Although one important advantage of the invention is the short cycle time accomplished in part by through-feed of the workpiece so that, for example, outfeed of one workpiece from the dwell position can occur concurrently with infeed of a succeeding workpiece to thereby compress total cycle time, the invention is not limited to through-feed in all applications. For example, bolts in headdown position may be fed upwardly into the coil to the dwell position and then may be released to drop out of the same end of the coil following heat treatment.

An array of heating coils can be provided for simultaneous treatment of a number of workpieces, as shown in plan view in FIG. 12. A corresponding number of positioning and feeding means is provided. In FIG. 12, the six inductor coils 51 are connected in series through conductors 52 to the terminals 53 of a power source (not shown). Protective sleeves may be provided. Each of these may be similar to the sleeve 12 (FIG. 1) but may have flared ends 55 to partly cover and better protect the topmost turn of each coil.

The invention has been used with four coil arrays as well as six coil arrays, and the number of stations is limited in practice only by the practical requirements of orienting and feeding of the workpieces to the inductor coils.

FIGS. 8 and 9 illustrate the close control of hardened depth accomplished by the present invention by varying the power-on time or the power input or both. With reference to FIGS. 8A, 8B, and 8C, bolts having a ½ inch diameter and a number 13 thread were heated in an array of four inductor coils each having an inside diameter of ½ inch. The coils were connected in series and powered by a 50 kw rf generator at 400 kilohertz. FIGS. 8A, 8B and 8C illustrate the results with a power-on time of 1.2 seconds, 1.3 seconds and 1.5 seconds, respectively. The hardening becomes progressively deeper with increased power-on time, and very close control can be accomplished by selection of a power-on time to correspond to the desired depth of hardening.

The bolts shanks shown in FIGS. 9A and B are again of ½ inch diameter and have a number 13 thread. An array of six inductor coils each having an inside diameter of one inch were powered by a 60 kw rf generator at 400 kilohertz and were used to heat these workpieces. The power-on times for the workpieces shown in FIGS. 9A and 9B were 0.8 seconds and 1.1 seconds, respectively. Again, the close control of depth of hardening is illustrated, the depth of FIG. 9B being only slightly greater than the depth in FIG. 9A, and good uniformity being maintained in both instances.

FIGS. 10A, 10B and 10C illustrate a variety of shapes of workpieces treated in the same inductor, with the area of hardening being indicated in each instance. A variation in part geometry can be tolerated by the loosely coupled coil.

FIG. 10D illustrates that the loosely coupled coil lends itself to special arrangements for heating various parts of the workpieces at various locations. In this instance, windings 57 of special shape heat the head, bearing surface and shank of the workpiece to a shallow controlled depth at the same time that the lower windings heat the threaded portion.

FIGS. 10E and 10F illustrate that the part size can vary widely for a given coil by varying the power input, power-on time, and frequency.

Where the workpiece requires protection from the oxidizing effects of the normal atmosphere, the loosely coupled coil can easily be adapted to operation within a created atmosphere of inert gases or reducing gases. Portions of the feed tube 41 (FIG. 11) can be modified to function as entrance purgeable chambers by use of mechanical, pneumatic or electrically controlled valves and the provision of a slight positive pressure within the feed tube.

The above disclosure is by way of example.

What is claimed is:

1. A method of hardening steel workpieces in localized areas to closely controlled depths of hardening with a high degree of symmetry and uniformity comprising the steps of: feeding each workpiece axially to an inductor coil with a dwell at a position when the localized areas to be treated are surrounded by the coil and are substantially centered with respect to the field produced by said coil, the spacing between the workpiece and the coil materially exceeding the spacing required for close electromagnetic coupling, the parts being positionally related for loose electromagnetic coupling in a zone having a substantially lower flux density gradient than zones closely adjacent to said coil to minimize product variations resulting from inaccurate positioning of the workpiece, slight irregularities in the coil or dimensional variations from workpiece to workpiece, energizing the coil to establish loosely coupled induction heating of each workpiece with however a sufficiently high rate of heat generation to raise the metal in the localized areas to austenitizing temperature at locations shallower than the desired depth of hardening without heat penetration to austenitizing temperature occurring below the desired depth of hardening, and quenching the workpiece by subjecting it to coolant fluid to accomplish rapid cooling prior to the occurrence of austenitizing heat penetration below the desired depth of hardening.

2. A method of hardening steel workpieces in localized areas to closely controlled depths of hardening with a high degree of symmetry and uniformity comprising the steps of: feeding each workpiece axially to an inductor coil with a dwell at a position when the localized areas to be treated are surrounded by the coil with the spacing between the workpiece and the coil materially exceeding the spacing required for close electromagnetic coupling, the parts being positionally related for loose electromagnetic coupling in a zone having a substantially lower flux density gradient than zones closely adjacent to said coil to minimize product variations resulting from inaccurate positioning of the workpiece, slight irregularities in the coil or dimensional variations from workpiece to workpiece, such feeding occurring with loose mechanical constraint of the workpiece so that it is approximately centered with respect to the coil but is free to float to a more precisely centered position, energizing the coil during the dwells to electromagnetically precisely align and center each workpiece with respect to the coil and to establish loosely coupled induction heating of each workpiece with however a sufficiently high rate of heat generation to raise the metal in the localized areas to austenitizing temperature at locations shallower than the desired depth of hardening without heat penetration to austenitizing temperature occurring below the desired depth of hardening, and quenching the workpiece by subjecting it to coolant fluid to accomplish rapid cooling prior to the occurrence of austenitizing heat penetration below the desired depth of hardening.

3. A method of hardening steel workpieces in localized areas to closely controlled depths of hardening with a high degree of symmetry and uniformity, the workpieces comprising screws, bolts or fasteners, or the like having a head portion of relatively large outside diameter and a shank portion of relatively small outside diameter, the method comprising the steps of: providing an inductor coil having an inside diameter greater than the maximum outside diameter of the workpieces, unidirectionally feeding the workpieces including the heads thereof axially through the coil with a dwell at a position when each workpiece shank is surrounded by the coil and is substantially centered with respect to the electromagnetic field produced thereby, the spacing between said shank and coil materially exceeding the spacing required for close electromagnetic coupling, energizing the coil to accomplish loosely coupled induction heating of each workpiece shank with the coil and any intervening insulator means spaced from the shank by at least the distance by which the head of the workpiece protrudes radially beyond the shank with however a sufficiently high rate of heat generation to raise the metal in the localized areas to austenitizing temperature at locations shallower than the desired depth of hardening without heat penetration to austenitizing temperature occurring below the desired depth of hardening, and quenching the workpiece by subjecting it to coolant fluid to accomplish rapid cooling prior to the occurrence of austenitizing heat penetration below the desired depth of hardening.

4. A method of hardening steel workpieces in localized areas to closely controlled depths of hardening with a high degree of symmetry and uniformity, the workpieces comprising screws, bolts or fasteners, or the like having a head portion of relatively large outside diameter and a shank portion of relatively small outside diameter, the method comprising the steps of: providing an inductor coil having an inside diameter greater than the maximum outside diameter of the workpieces, unidirectionally feeding the workpieces including the heads thereof axially through the coil with a dwell at a position when each workpiece shank is surrounded by the coil and is spaced therefrom by an amount materially exceeding the spacing required for close electromagnetic coupling, such feeding occurring with loose mechanical constraint of the workpiece so that its shank is approximately centered with respect to the coil but is free to float to a more precisely centered position, energizing the coil during the dwells to electromagnetically precisely align and center each workpiece shank with respect to the coil and to accomplish loosely coupled induction heating of each workpiece shank with the coil and any intervening insulator means spaced from the shank by at least the distance by which the head of the workpiece protrudes radially beyond the shank with however a sufficiently high rate of heat generation to raise the metal in the localized areas to austenitizing temperature at locations shallower than the desired depth of hardening without heat penetration to austenitizing temperature occurring below the desired depth of hardening, and quenching the workpiece by subjecting it to coolant fluid to accomplish rapid cooling prior to the occurrence of austenitizing heat penetration below the desired depth of hardening.

5. A method of hardening steel workpieces in localized areas to closely controlled depths of hardening with a high degree of symmetry and uniformity, the workpieces comprising thread taps, cutting tools, recess driving tools or the like with a portion of the shank having alternating flutes and ridges extending lengthwise thereof, comprising the steps of: feeding each workpiece axially through an inductor coil with a dwell at a position where each workpiece is substantially centered with respect to the electromagnetic field produced by said coil, each workpiece in said position having the fluted and ridged shank surrounded by the coil with the spacing between the workpiece and the coil materially exceeding the spacing required for close electromagnetic coupling, the parts being positionally related for loose electromagnetic coupling in a zone having substantially lower flux density gradient than the zones closely adjacent to said coil to minimize product variations resulting from, inaccurate positioning of the workpiece, slight irregularities in the coil or dimensional variations from workpiece to workpiece, energizing the coil during the dwells to establish loosely coupled induction heating of each workpiece with however a sufficiently high rate of heat generation to raise the metal in the localized areas to austenitizing temperature at locations shallower than the desired depth of hardening without heat penetration or austenitizing temperature occurring below the desired depth of hardening, and quenching the workpiece by subjecting it to coolant fluid to accomplish rapid cooling prior to the occurrence of austenitizing heat penetration below the desired depth of hardening.

6. A method of hardening steel workpieces in localized areas to closely controlled depths of hardening with a high degree of symmetry and uniformity, the workpieces comprising thread taps, cutting tools, recess driving tools or the like with a portion of the shank having alternating flutes and ridges extending lengthwise thereof, comprising the steps of: feeding each workpiece axially through an inductor coil with a dwell at a position where the fluted and ridged shank is surrounded by the coil with the spacing between the workpiece and the coil materially exceeding the spacing required for close electromagnetic coupling, the parts being positionally related for loose electromagnetic coupling in a zone having substantially lower flux density gradient than the zones closely adjacent to said coil to minimize product variations resulting from, inaccurate positioning of the workpiece, slight irregularities in the coil and dimensional variations from workpiece to workpiece, such feeding occurring with loose mechanical constraint of the workpiece so that the fluted and ridged shank is approximately centered with respect to the coil but is free to float to a more precisely centered position, energizing the coil during the dwells to electromagnetically precisely align and center each workpiece with respect to the coil and to establish loosely coupled induction heating of each workpiece with however a sufficiently high rate of heat generation to raise the metal in the localized areas to austenitizing temperature at locations shallower than the desired depth of hardening without heat penetration to austenitizing temperature occurring below the desired depth of hardening, and quenching the workpiece by subjecting it to coolant fluid to accomplish rapid cooling prior to the occurrence of austenitizing heat penetration below the desired depth of hardening.

* * * * *